United States Patent
Sakashita et al.

(10) Patent No.: US 10,468,664 B2
(45) Date of Patent: Nov. 5, 2019

(54) METHOD OF MANUFACTURING LITHIUM-ION SECONDARY BATTERY ELECTRODE SHEET

(71) Applicants: TOYOTA JIDOSHA KABUSHIKI KAISHA, Toyota-shi, Aichi-ken (JP); ZEON CORPORATION, Tokyo (JP)

(72) Inventors: Yasuhiro Sakashita, Nisshin (JP); Koichi Tanihara, Miyoshi (JP); Yuji Shibata, Kawasaki (JP); Hiroyuki Sekine, Yokohama (JP)

(73) Assignees: TOYOTA JIDOSHA KABUSHIKI KAISHA, Toyota-shi, Aichi (JP); Zeon Corporation, Tokyo (JP)

( * ) Notice: Subject to any disclaimer, the term of this patent is extended or adjusted under 35 U.S.C. 154(b) by 0 days.

(21) Appl. No.: 15/322,973

(22) PCT Filed: Jun. 12, 2015

(86) PCT No.: PCT/JP2015/002968
§ 371 (c)(1),
(2) Date: Dec. 29, 2016

(87) PCT Pub. No.: WO2016/002139
PCT Pub. Date: Jan. 7, 2016

(65) Prior Publication Data
US 2017/0133659 A1    May 11, 2017

(30) Foreign Application Priority Data
Jul. 2, 2014   (JP) ................................ 2014-136648

(51) Int. Cl.
*H01M 4/04*     (2006.01)
*H01M 4/139*     (2010.01)
(Continued)

(52) U.S. Cl.
CPC ....... *H01M 4/0416* (2013.01); *H01M 4/0404* (2013.01); *H01M 4/0409* (2013.01);
(Continued)

(58) Field of Classification Search
CPC ............. H01M 4/0416; H01M 4/0435; H01M 10/0525; B05D 1/06; B05D 1/12;
(Continued)

(56) References Cited

U.S. PATENT DOCUMENTS

| | | | | |
|---|---|---|---|---|
| 2,905,569 A | * | 9/1959 | Zitke | B05D 1/12 |
| | | | | 118/301 |
| 3,799,808 A | * | 3/1974 | Hancock | B22F 3/1109 |
| | | | | 264/316 |

(Continued)

FOREIGN PATENT DOCUMENTS

| | | | | |
|---|---|---|---|---|
| CN | 1023384 C | | 1/1994 | |
| JP | 2007/095839 | * | 4/2007 | H01M 4/04 |
| | | | | 427/115 |

(Continued)

OTHER PUBLICATIONS

International Search Report for PCT/JP2015/002968 dated Sep. 21, 2015 [PCT/ISA/210].

(Continued)

*Primary Examiner* — Brian K Talbot
(74) *Attorney, Agent, or Firm* — Sughrue Mion, PLLC

(57) ABSTRACT

A method of manufacturing a lithium-ion secondary battery electrode sheet includes the steps of: conveying a current collector (11) coated with a binder solution (12); feeding a powder material (13) of granulated particles (13a) onto the current collector (11) while guiding the powder material (13) of the granulated particles (13a) toward a gap between the current collector (11) and a squeegee member (25) disposed so as to be spaced with the gap from the current collector (Continued)

(11) being conveyed; and shaping the powder material (13) of the granulated particles (13a) fed on the current collector (11) by using a squeegee member (25).

7 Claims, 2 Drawing Sheets

(51) Int. Cl.
    *H01M 10/0525*     (2010.01)
    *B05C 5/02*     (2006.01)
    *B05D 1/26*     (2006.01)
    *B05D 1/06*     (2006.01)
    *B05D 1/12*     (2006.01)
    *B05D 1/40*     (2006.01)
    *B05D 5/12*     (2006.01)

(52) U.S. Cl.
    CPC .......... *H01M 4/0435* (2013.01); *H01M 4/139* (2013.01); *H01M 10/0525* (2013.01); *B05C 5/02* (2013.01); *B05C 5/0245* (2013.01); *B05D 1/06* (2013.01); *B05D 1/12* (2013.01); *B05D 1/26* (2013.01); *B05D 1/40* (2013.01); *B05D 5/12* (2013.01)

(58) Field of Classification Search
    CPC .... B05D 1/26; B05D 1/40; B05D 5/12; B05C 5/02; B05C 5/0245
    USPC ................................ 427/115, 194, 359, 369
    See application file for complete search history.

(56) References Cited

U.S. PATENT DOCUMENTS

| | | | | |
|---|---|---|---|---|
| 4,110,241 A * | 8/1978 | Pirkulov | ................. | H01M 4/56 252/182.1 |
| 4,851,069 A * | 7/1989 | Packard | ............. | A61F 13/1565 156/284 |
| 5,145,529 A * | 9/1992 | Rummer | ................ | B05C 5/001 118/126 |
| 6,139,302 A * | 10/2000 | Wood | .................... | C01B 3/0084 425/145 |
| 6,582,760 B2 * | 6/2003 | Aschenbeck | ........... | B05C 19/04 427/186 |
| 2003/0044525 A1 * | 3/2003 | Aschenbeck | ............. | B05C 9/04 427/186 |
| 2003/0201052 A1 * | 10/2003 | Koslow | ............. | A61F 13/15658 156/62.2 |
| 2004/0101619 A1 * | 5/2004 | Camorani | ............ | B05B 7/1495 427/180 |
| 2006/0153972 A1 | 7/2006 | Hirokawa | | |
| 2010/0021641 A1 * | 1/2010 | Pisklak | ................... | B05C 19/04 427/346 |
| 2011/0229636 A1 * | 9/2011 | Aschenbeck | .......... | D06N 5/003 427/186 |
| 2012/0107560 A1 * | 5/2012 | Rogers | ................. | B29C 70/025 428/147 |
| 2012/0141657 A1 * | 6/2012 | Aschenbeck | ........... | B05C 19/04 427/8 |
| 2016/0018250 A1 * | 1/2016 | Sollazzo Lee | ......... | G01G 13/02 222/1 |
| 2016/0149208 A1 * | 5/2016 | Suzuki | ................ | H01M 4/0404 429/209 |

FOREIGN PATENT DOCUMENTS

| | | | | |
|---|---|---|---|---|
| JP | 2007-095839 A | | 4/2007 | |
| JP | 2013-012327 | * | 1/2013 | ............. H01M 4/36 427/115 |
| JP | 2013-012327 A | | 1/2013 | |

OTHER PUBLICATIONS

Written Opinion for PCT/JP2015/002968 dated Sep. 21, 2015 [PCT/ISA/237].

* cited by examiner

METHOD OF MANUFACTURING LITHIUM-ION SECONDARY BATTERY ELECTRODE SHEET

CROSS REFERENCE TO RELATED APPLICATIONS

This application is a National Stage of International Application No. PCT/JP2015/002968 filed Jun. 12, 2015, claiming priority based on Japanese Patent Application No. 2014-136648 filed Jul. 2, 2014, the contents of all of which are incorporated herein by reference in their entirety.

TECHNICAL FIELD

The present invention relates to a method of manufacturing a lithium-ion secondary battery electrode sheet. In the present description, the term "secondary battery" refers to a repeatedly rechargeable battery in general. The term "lithium-ion secondary battery" refers to a secondary battery that uses lithium ions as the electrolyte ions and implements charging and discharging by the transfer of electric charge which is associated with the transfer of the lithium ions between the positive and negative electrodes. The lithium-ion secondary battery is one type of non-aqueous electrolyte secondary battery, which uses a non-aqueous electrolyte comprising a non-aqueous solvent in which an electrolyte salt is dissolved. The present application claims priority from Japanese Patent Application No. 2014-136648, filed on Jul. 2, 2014, the entirety of which is incorporated by reference into this specification.

BACKGROUND ART

JP 2013-012327 A discloses that an electrode sheet is manufactured by coating a binder solution on a current collector, thereafter depositing powder of granulated particles containing active material particles and a binder, and pressing the deposited layer in a thickness direction while heating the deposited layer.

JP 2007-095839 A also discloses a method of manufacturing a sheet for an electric chemical element electrode. The method of manufacturing a sheet for an electric chemical element electrode disclosed therein includes a process of continuously feeding an electrode material to a pair of press rolls or belts arranged substantially horizontally, by means of a powder feeding machine in which vibrations caused by ultrasonic waves are imparted to a powder storage tank.

CITATION LIST

Patent Literature

[PLT 1] JP 2013-012327 A
[PLT 2] JP 2007-095839 A

SUMMARY OF INVENTION

Technical Problem

The present inventors have investigated a technique of forming a lithium-ion secondary battery electrode sheet in which a layer of active material particles is formed on a current collector, by coating a binder solution onto a current collector and thereafter feeding powder of granulated particles containing active material particles and a binder. In this case, it is desirable to form the layer of active material particles on the current collector with high accuracy.

Solution to Problem

A method of manufacturing a lithium-ion secondary battery electrode sheet proposed herein includes the following steps 1 through 7.

1. Preparing a strip-shaped current collector.
2. Preparing a powder material of granulated particles containing active material particles and a first binder.
3. Preparing a binder solution containing a second binder in a solvent.
4. Coating the current collector with the binder solution.
5. Conveying the current collector coated with the binder solution.
6. Feeding the powder material of the granulated particles onto the current collector while guiding the powder material of the granulated particles toward a gap between the current collector and a squeegee member disposed so as to be spaced with the gap from the current collector that is being conveyed.
7. Shaping the powder material of the granulated particles fed on the current collector, by using the squeegee member.

The just-described method of manufacturing a lithium-ion secondary battery electrode sheet makes it possible to form a layer of the powder material of the granulated particles on the current collector with high accuracy. From such a viewpoint, it is also possible that when viewed from an upstream side of a conveying direction of the current collector, the powder material of the granulated particles is fed to an arbitrary position located within 5 cm upstream from a position at which the gap between the current collector and the squeegee member is narrowest.

It is also possible that, in the step of feeding the powder material of the granulated particles, the powder material of granulated particles may be accommodated in a container having a discharge port from which the powder material of granulated particles is discharged, In this case, it is desirable that a guide member be disposed from the discharge port toward the gap. In addition, it is desirable that the powder material of the granulated particles be put on the guide member and fed to the gap between the squeegee member and the current collector being conveyed.

It is also possible that the guide member may have a guide surface, the height of which gradually lowers from the discharge port toward gap. In this case, it is desirable that the powder material of the granulated particles be fed along the guide surface.

It is also possible that the powder material of the granulated particles may be fed from the discharge port toward the gap by vibrating the guide surface. It is also possible that the amount of the powder material passing through the discharge port may be adjusted according to the amount of the powder material that has remained before the squeegee member. It is also possible that the squeegee member may be a cylindrically-shaped roller member and may be disposed so that its outer circumferential surface faces the current collector. In this case, it is desirable that the guide member guide the powder material of the granulated particles to the gap between the roller member and the current collector.

BRIEF DESCRIPTION OF DRAWINGS

FIG. 2 is a schematic view illustrating a granulated particle 13a.

DESCRIPTION OF EMBODIMENTS

Figure 1:
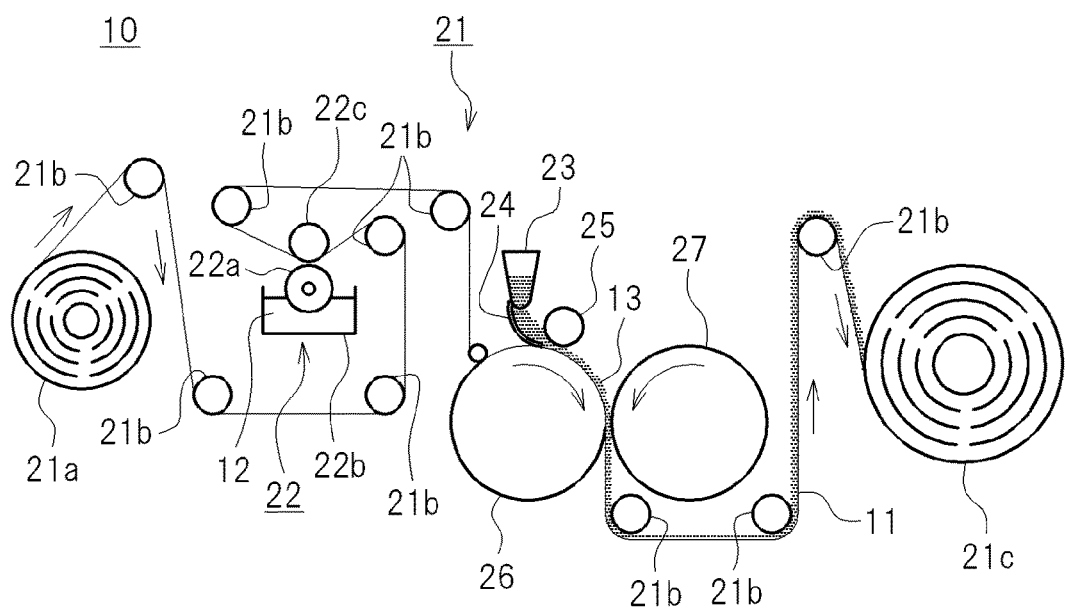
FIG. 1 is a schematic view illustrating a manufacturing apparatus that embodies a method of manufacturing a lithium-ion secondary battery electrode sheet proposed herein.

The following description is given to illustrate an example of the embodiments of a method of manufacturing a lithium-ion secondary battery electrode sheet proposed herein. The embodiments described herein are not intended to limit the present invention. The drawings are depicted schematically, and the dimensional relationship (length, width, thickness, and the like) in the drawings, for example, does not necessarily reflect actual dimensional relationship. The parts and components that exhibit the same effects are denoted by the same reference symbols, and repetitive description thereof may be omitted as appropriate.

«Manufacturing Apparatus 10»

Figure 2:
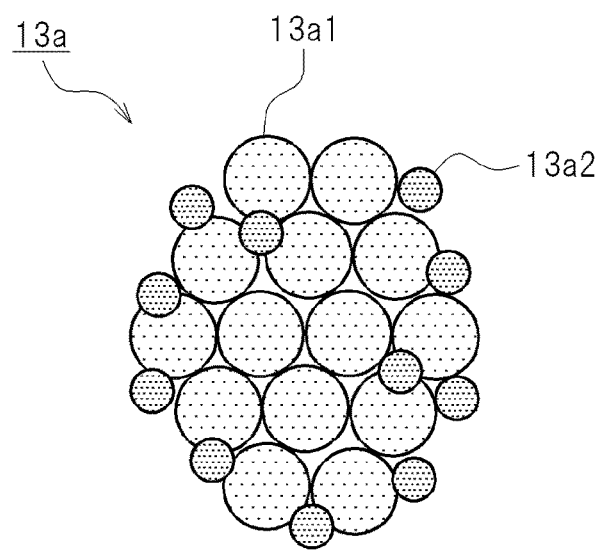

FIG. 1 is a schematic view illustrating a manufacturing apparatus 10 that embodies a method of manufacturing a lithium-ion secondary battery electrode sheet proposed herein. As illustrated in FIG. 1, the manufacturing apparatus 10 has a conveyor device 21, a coating device 22, a feeding device 23, a guide member 24, a squeegee member 25, and pressure rollers 26 and 27. The conveyor device 21 is a device for conveying a current collector 11. The coating device 22 is a device for applying a binder solution 12. The feeding device 23 is a device for feeding a powder material 13 of granulated particles 13a (see FIG. 2). The details of these devices that constitute the manufacturing apparatus 10 will be described later. FIG. 2 is a view schematically illustrating the granulated particle 13a.

«Method of Manufacturing a Lithium-Ion Secondary Battery Electrode Sheet»

A method of manufacturing a lithium-ion secondary battery electrode sheet proposed herein includes the following steps 1 through 7:
1. preparing a strip-shaped current collector 11;
2. preparing a powder material 13 of granulated particles 13a containing active material particles 13a1 and a first binder 13a2;
3. preparing a binder solution 12 containing a second binder in a solvent;
4. coating the current collector 11 with the binder solution 12;
5. conveying the current collector 11 coated with the binder solution 12;
6. feeding the powder material 13 of the granulated particles 13a onto the current collector 11 while guiding the powder material 13 of the granulated particles 13a toward a gap between the current collector 11 and a squeegee member 25 disposed so as to be spaced with the gap from the current collector 11 that is being conveyed; and
7. shaping the powder material 13 of the granulated particles 13a fed on the current collector 11, by using the squeegee member 25.

«Step of Preparing the Current Collector 11»

At step 1, the current collector 11 is prepared. The current collector 11 prepared here is a member for obtaining electricity in the lithium-ion secondary battery electrode sheet. For example, the material suitable as the current collector 11 used for a lithium-ion secondary battery is a material that has good electron conductivity and is capable of existing stably within the battery. The current collector 11 also requires being lightweight, predetermined mechanical strength, processability, and so forth. For example, an aluminum foil is used as the current collector 11 for the positive electrode of a lithium-ion secondary battery. A copper foil is used as the current collector 11 for the negative electrode thereof. In the example shown in FIG. 1, a strip-shaped metal foil (specifically, an aluminum foil (thickness 15 μm) or a copper foil (thickness 10 μm)) is prepared as the current collector 11, and although not shown in the figure, it is prepared in a condition of being coiled around a winding core. Such a strip-shaped current collector 11 is suitable for subjecting it to a predetermined treatment while it is being conveyed in a roll-to-roll process, as illustrated in FIG. 1.

In the example shown in FIG. 1, the strip-shaped current collector 11 as the current collector is wrapped around a roll 21a. The conveyor device 21 is provided with a plurality of pulleys 21b, and a predetermined conveyance passage is set therein. The current collector 11 is drawn out from the roll 21a and is conveyed along the conveyance passage. Then, a layer of the active material particles is formed on the conveyance passage, and the current collector 11 is taken up around a roll 21c. It should be noted that the current collector need not be a metal foil. For example, depending on the use of the lithium-ion secondary battery electrode sheet that is to be manufactured, the current collector 11 may be an electrically conductive resin film. In the present specification, the term "preparing" may mean, for example, obtaining a required material from a manufacturer of the material as appropriate.

«Step of Feeding Powder Material 13 of Granulated Particles 13a»

At step 2, the powder material 13 of the granulated particles 13a is prepared. It is desirable that the granulated particles 13a prepared here contain at least active material particles 13a1 and a binder 13a2. The powder material 13 of the granulated particles 13a can be obtained by, for example, granulating a mixture (suspension) in which the active material particles 13a1 and the binder 13a2 are mixed with a solvent by a spray drying method. In the spray drying method, the mixture is sprayed in a dry atmosphere. At this stage, the particles contained in each of the sprayed droplets are merged into roughly one aggregate and formed into a larger particle. Therefore, depending on the size of the droplets, the solid content contained in the granulated particle 13a can vary, and also, the size, mass, and the like of the granulated particle 13a can vary. It is desirable that the droplets to be sprayed contain at least the active material particles 13a1 and the binder 13a2. It is also possible that the droplets to be sprayed may contain materials other than the active material particles 13a1 and the binder 13a2. For example, a conductive agent may be contained therein. It is desirable that the granulated particles 13a prepared here have a mean particle size of from about 60 μm to 100 μm. In the present specification, the term "mean particle size" means a particle size at a cumulative volume of 50% in the particle size distribution determined by a laser scattering and diffraction method using a particle size analyzer, in other words, a 50% volume average particle size, unless otherwise specifically mentioned.

<Active Material Particle 13a1>

The method of manufacturing a lithium-ion secondary battery electrode sheet proposed herein is applicable to various types of lithium-ion secondary battery electrode sheets. For example, the method can be applied either to the positive electrode sheet or to the negative electrode sheet of the lithium-ion secondary battery. When an electrode sheet for the positive electrode is manufactured, the active material particles for the positive electrode of the lithium-ion secondary battery are used for the active material particles $13a1$. On the other hand, when an electrode sheet for the negative electrode is manufactured, the active material particles for the negative electrode of the lithium-ion secondary battery are used for the active material particles $13a1$. The active material particles $13a1$ may vary depending on the lithium-ion secondary battery to be manufactured.

<Examples of Active Material Particles Used in Positive Electrode for Lithium-Ion Secondary Battery>

Herein, the lithium-ion secondary battery is taken as an example. Preferable examples of the active material particles $13a1$ used in the positive electrode of the lithium-ion secondary battery include: oxides containing lithium and one or more transition metal elements (i.e., lithium-transition metal oxide), such as lithium nickel oxide (for example, $LiNiO_2$), lithium cobalt oxide (for example, $LiCoO_2$), and lithium manganese oxide ($LiMn_2O_4$); and phosphates containing lithium and one or more transition metal elements, such as lithium manganese phosphate ($LiMnPO_4$) and lithium iron phosphate ($LiFePO_4$). These are used in particulate form and may be referred to as positive electrode active material particles, as appropriate. The positive electrode active material particles may be used either alone or in combination. Because these positive electrode active material particles have low electrical conductivity, the positive electrode active material layer contains a conductive agent in order to enhance the electrical conductivity. In this case, it is desirable that the conductive agent be contained in droplets that are sprayed in spray drying.

<Examples of Active Material Particles Used in Negative Electrode of Lithium-ion Secondary Battery>

Preferable examples of the active material particles used in the negative electrode of the lithium-ion secondary battery include carbon-based materials, such as graphite carbons and amorphous carbons, lithium-transition metal oxides, and lithium-transition metal nitrides. These are used in particulate form and may be referred to as negative electrode active material particles, as appropriate. The negative electrode active material particles may be used either alone or in combination. The negative electrode active material layer may contain a conductive agent in order to enhance the electrical conductivity. In this case, it is desirable that the conductive agent be contained in droplets that are sprayed in spray drying.

<Conductive Agent (Conductivity Enhancing Agent)>

Examples of the conductive agent include carbon materials, such as carbon powder and carbon fiber. It is possible to use one of the just-mentioned examples of the conductive agents either alone or in combination with another one or more of the examples. Examples of the carbon powder include powders of acetylene black, oil-furnace black, graphitized carbon black, carbon black, Ketjen Black, and graphite. Such conductive agents are preferably added when active material particles $13a1$ with poor electrical conductivity are used to form conductive paths between the active material particles $13a1$ and the current collector $11$.

«Binder $13a2$»

Next, the following describes the binder $13a2$ that is to be added to the granulated particles $13a$ in the step of preparing granulated particles $13a$. The granulated particles $13a$ are preferably granulated by a spray drying method. For this reason, a polymer that can be dissolved or dispersed in a solvent is used as the binder $13a2$ that is to be added to the granulated particles $13a$. Examples of the polymer that can be dissolved or dispersed in an aqueous solvent include rubber materials (such as styrene-butadiene copolymer (SBR) and acrylic acid-modified SBR resin (SBR latex)), vinyl acetate copolymers, and acrylate polymers. Examples of the polymer that can be dissolved or dispersed include polyvinylidene fluoride (PVDF). It is also possible to use a cellulose-based polymer, a fluoropolymer (such as polytetrafluoroethylene (PTFE)), or the like, as the binder $13a2$ that is to be added to the granulated particles $13a$. Note that although examples of the binder $13a2$ that is to be added to the granulated particles $13a$ are shown herein, the binder $13a2$ that is to be added to the granulated particles $13a$ is not limited to the examples shown herein.

«Step of Preparing Binder Solution $12$»

At step 3, the binder solution $12$ is prepared. The binder solution $12$ prepared here is a solution in which a binder (second binder) is mixed with a solvent. From the viewpoint of reducing the environmental load, it is preferable to use what is called an aqueous solvent as the solvent for the binder solution $12$. In this case, water or a mixed solvent mainly composed of water is used. The solvent of the binder solution $12$ is not limited to what is called an aqueous solvent, but may be what is called an organic-based solvent. An example of the organic-based solvent is N-methylpyrrolidone (NMP).

It is also preferable that the binder contained in the binder solution $12$ (i.e., the second binder) be one that can be dispersed in a solvent. In the present embodiment, preferable examples include styrene-butadiene rubber (SBR) and polyacrylic acid (PAA), because the solvent is an aqueous solvent. When an organic-based solvent is used as the solvent, preferable examples of the binder include polyvinylidene fluoride (PVdF) and polyacrylic acid (PAA). As a preferable example of the binder solution $12$, it is desirable for the positive electrode of the lithium-ion secondary battery that water be used as the solvent and an acrylic resin (e.g., polymethyl methacrylate) as the binder be mixed with the solvent. For the negative electrode of the lithium-ion secondary battery, it is desirable that water be used as the solvent and SBR as the binder be mixed with the solvent.

«Step of Coating Binder Solution $12$»

At step 4, the binder solution $12$ is applied onto the current collector foil $11$. It is desirable that the binder solution $12$ be applied onto the current collector $11$ in a predetermined pattern. It is also desirable that the binder solution $12$ be applied thinly onto the current collector $11$, for example, at a thickness of from about 1 μm to 20 μm, and be applied by gravure printing or the like. For example, a direct gravure roll coater can be used as the coating device $22$. Such a coating device $22$ allows the binder solution $12$ to be transferred onto the current collector $11$ by direct gravure printing using the gravure roller $22a$ having minute patterns engraved on the surface thereof. It is desirable that the gravure roller $22a$ have, for example, a plurality of grooves having a print depth of about from 10 μm to 30 μm (for example, 20 μm), a width of 50 μm, and a pitch of 200 μm, along an oblique line inclined with respect to the rotational axis. The pattern of grooves formed in the gravure roller $22a$ may be a horizontal striped pattern or a grid pattern. Although not shown in the drawings, the grid pattern may be, for example, such a pattern in which oblique lines are combined with a grid pattern. The horizontal striped pattern may be such that the binder solution $12$ is applied along the width direction of the strip-shaped current collector $11$ and at a predetermined interval along the length direction thereof. The width and the pitch of the grooves of the gravure roller $22a$ may be varied in a variety of ways.

In the example shown in FIG. 1, it is desirable that the strip-shaped current collector 11 be conveyed with the treatment surface to be coated with the binder solution 12 (i.e., the surface on which the active material layer is to be formed) facing downward, and that the gravure roller 22a be applied to the current collector 11 in such a condition. The lower side of the gravure roller 22a is immersed in the binder solution 12 stored in a reservoir 22b. In addition, a backing roller 22c is applied to the opposite side of the current collector 11 to the surface thereof with which the gravure roller 22a makes contact. Thereby, the binder solution 12 stored in the reservoir 22b is continuously transferred to the current collector 11 through the gravure roller 22a. It is desirable that the binder solution 12 be applied to the current collector 11 at a thickness of, for example, from about 1 µm to about 10 µm.

«Step of Conveying Current Collector 11»

At step 5, the current collector 11 coated with the binder solution 12 is conveyed. In this embodiment, the current collector 11 coated with the binder solution 12 is conveyed along the conveyance passage by the conveyor device 21.

«Step of Feeding Powder Material 13»

Figure 3:
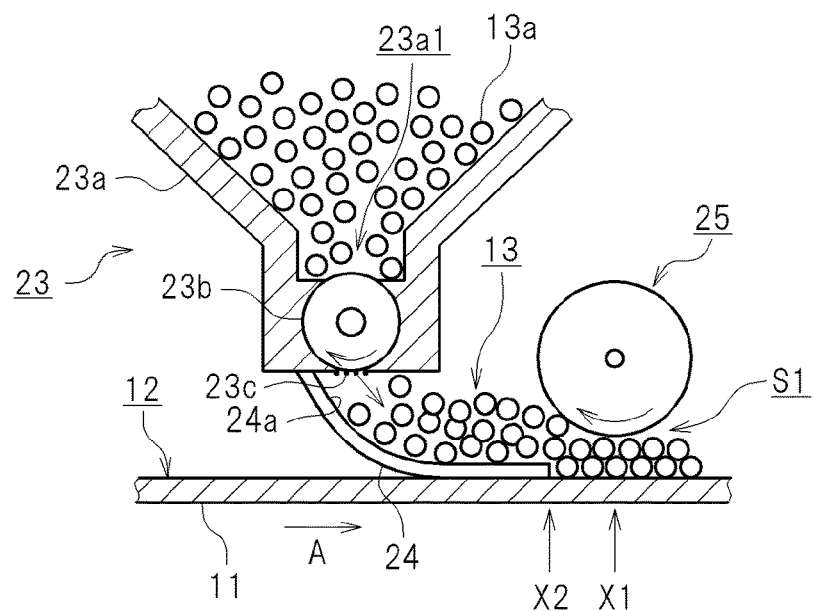
FIG. 3 is an enlarged view of the portion at which a powder material 13 of granulated particles 13a is fed on a current collector 11.

At step 6, the powder material 13 of the granulated particles 13a is fed on the current collector 11. Here, FIG. 3 is an enlarged view of the portion at which the powder material 13 of the granulated particles 13a is fed on the current collector 11. In this embodiment, the squeegee member 25 is disposed so as to be spaced with a gap S1 from the current collector 11 that is being conveyed, as illustrated in FIG. 3. The powder material 13 of the granulated particles 13a is fed onto the current collector 11 while it is being guided toward the gap S1 between the current collector 11 and the squeegee member 25.

In the example shown in FIG. 1, the current collector 11 (strip-shaped current collector foil) is turned along the pulleys 21b of the conveyor device 21 and is conveyed so that the treatment surface coated with the binder solution 12 faces upward. As illustrated in FIG. 3, the feeding device 23, the guide member 24, the squeegee member 25, and the pressure rollers 26 and 27 are disposed in the conveyance passage of the current collector 11.

<Feeding Device 23>

The feeding device 23 is provided with a hopper 23a for storing the powder material 13 of the granulated particles 13a. Although not shown in the drawings, it is desirable that the hopper 23a be provided with an adjusting device for adjusting the amount of the powder material 13 of the granulated particles 13a to be supplied. In this case, it is desirable that, for example, the hopper 23a adjust the amount of the powder material 13 to be discharged to discharge an appropriate amount of the powder material 13.

A lower portion of the hopper 23a is provided with a discharge port 23a1, and a brush rotator 23b and a mesh 23c are attached to the discharge port 23a1 of the hopper 23a, as illustrated in FIG. 3. In the example shown in FIG. 3, the mesh 23c is fitted so as to cover the discharge port 23a1. The brush rotator 23b is disposed above the mesh 23c. The brush rotator 23b closes the discharge port 23a1 and is also rotatably driven. The powder material 13 is caught by the brush rotator 23b, and is allowed to pass through the mesh 23c and through the discharge port 23a1.

Figure 4:
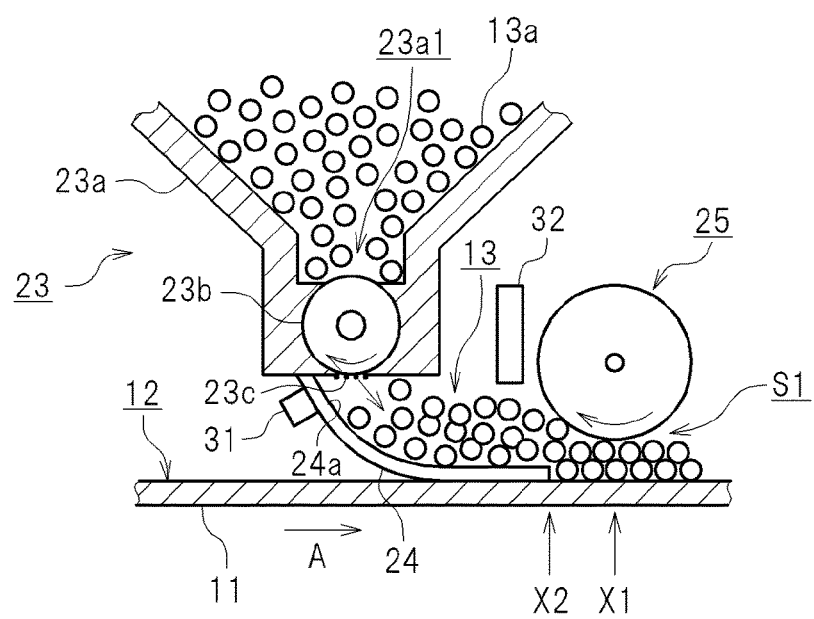
FIG. 4 is a view illustrating another embodiment of the portion at which the powder material 13 of the granulated particles 13a is fed on the current collector 11.

It is desirable that the rotational speed of the brush rotator 23b be controlled by a servomotor, although not shown in the drawings herein. It is a member for adjusting the amount of the powder material 13 that is discharged from the discharge port 23a1 of the hopper 23a by adjusting the rotational speed of the brush rotator 23b. The mesh 23c is a member for adjusting the size of the granulated particles 13a that come out from the discharge port 23a1 of the hopper 23a. That is, the mesh 23c is a net-like member, and when aggregates of the granulated particles 13a are formed in the powder material 13, it prevents the aggregates of the granulated particles 13a that are greater than a predetermined size from passing through the discharge port 23a1. Note that FIG. 3 and the later-mentioned FIG. 4 depict the granulated particles 13a as if they are greater, for example, relative to the rotary brush 23b and the mesh 23c in the figures.

<Guide Member 24>

The guide member 24 is a member for feeding the powder material 13 of the granulated particles 13a onto the current collector 11 while guiding it toward the gap S1 between the current collector 11 and the squeegee member 25. In this embodiment, the guide member 24 is disposed under the discharge port 23a1 of the hopper 23a. The guide member 24 receives the powder material 13 that has passed through the discharge port 23a1, and guides it toward the gap S1 between the current collector 11 and the squeegee member 25. It is desirable that when viewed from the upstream side in the conveying direction A of the current collector 11, the powder material 13 be fed at an arbitrary position X2 located within 5 cm upstream from a position X1 at which the gap S1 between the current collector 5 and the squeegee member 25 is narrowest. More preferably, it is desirable that the powder material 13 be fed at an arbitrary position X2 that is within 3 cm upstream from the position X1 at which the gap S1 between the current collector 3 and the squeegee member 25 is narrowest. Here, the position X1 in the figure is the position at which the gap S1 between the current collector 11 and the squeegee member 25 is narrowest. The position X2 is the position at which the powder material 13 of the granulated particles 13a is fed on the current collector 11.

With such a guide member 24 as described above, the powder material 13 is not allowed to come into contact with the current collector 11 until just before it is introduced to the squeegee member 25, but it is allowed to be fed onto the current collector 11 just before it is introduced to the squeegee member 25. In this case, the binder solution 12 has been applied onto the current collector 11, but the powder material 13 is fed onto the current collector 11 just before it is introduced to the squeegee member 25. Therefore, the powder material 13 is squeegeed in a condition that the binder solution 12 does not soak into the powder material 13 in the thickness direction. In this case, the excessive powder material 13 that is removed by the squeegee member 25 is not soaked with the binder solution 12, so the excessive powder material 13 can be smoothly removed by the squeegee member 25.

In contrast, the case in which the guide member 24 is not provided will be described, although it is not illustrated in the drawings. In this case, the powder material 13 is fed onto the current collector 11 coated with the binder solution 12 at an upstream point from the position at which the powder material 13 is introduced to the squeegee member 25. The binder solution 12 gradually permeates in the thickness direction of the fed powder material 13 until the powder material 13 is introduced to the squeegee member 25. If the powder material 13 is squeegeed in a condition that the binder solution 12 has permeated in the thickness direction of the powder material 13, the excessive powder material 13 that is removed by the squeegee member 25 can grow into large aggregates before the squeegee member 25, like forming snowballs. If such grown aggregates of the powder material 13 are formed, the powder material 13 fed on the current collector 11 may not be able to pass through the squeegee member 25 properly, or the aggregates of the powder material 13 may cause the powder material 13 fed on the current collector 11 to peel off.

In the method of manufacturing a lithium-ion secondary battery electrode sheet proposed herein, the above-described guide member 24 allows the powder material 13 to be fed just before the powder material 13 is introduced to the squeegee member 25. As a result, the excessive powder material 13 can be smoothly removed. Then, the powder material 13 passes through the squeegee member 25 along the conveyance passage, whereby the powder material 13 fed on the current collector 11 is appropriately shaped.

In the method of manufacturing a lithium-ion secondary battery electrode sheet proposed herein, it is desirable that the guide member 24 be disposed from the discharge port 23a1 toward the gap S1, as described above. In this case, it is desirable that the powder material 13 of the granulated particles 13a that is discharged from the discharge port 23a1 be put on the guide member 24 so as to be fed to the gap S1 between the squeegee member 25 and the current collector 11 that is being conveyed.

The guide member 24 has a guide surface 24a the height of which gradually lowers from the discharge port 23a1 of the hopper 23a toward the gap S1 between the current collector 11 and the squeegee member 25, as illustrated in FIG. 3, for example. In this case, the powder material 13 of the granulated particles 13a is fed along the guide surface 24a. FIG. 4 shows another embodiment. In the example shown in FIG. 4, a vibrator 31 for vibrating the guide surface 24a is fitted to a reverse surface of the guide member 24. In this case, the height of the guide surface 24a gradually lowers from the discharge port 23a1 of the hopper 23a toward the gap S1 between the current collector 11 and the squeegee member 25. In this case, because the guide surface 24a of the guide member 24 is vibrated by the vibrator 31, the powder material 13 of the granulated particles 13a moves downward along the guide surface 24a. Then, the powder material 13 of the granulated particles 13a is transferred from the discharge port 23a1 toward the gap S1. The guide member 24 is not limited to such. The guide member 24 may be one in which the powder material 13 of the granulated particles 13a is fed by sliding along the guide surface 24a, or may be a member that transfers the powder material 13 of the granulated particles 13a, like a conveyer.

In addition, the amount of the powder material 13 passing through the discharge port 23a1 may be adjusted according to the amount of the powder material 13 that has remained before the squeegee member 25. For example, in the embodiment shown in FIG. 4, a sensor 32 for measuring the amount of the powder material 13 is fitted before the squeegee member 25 in the conveying direction A of the current collector 11. Based on the height of the powder material 13 that is measured by the sensor 32, it is desirable that the number of revolution of the brush rotator 23b be adjusted in advance to adjust the amount of the powder material 13 passing through the discharge port 23a1. The above-described sensor 32 may be, for example, an object rangefinder sensor for measuring the distance to the powder material 13 that remains before the squeegee member 25. In this case, it may be a device that measures the height of the powder material 13 by applying a laser beam to the powder material 13.

<Squeegee Member 25>

In this embodiment, the squeegee member 25 is provided on the downstream side of the feeding device 23 (on the downstream side in the conveyance passage of the current collector foil), as illustrated in FIGS. 3 and 4. The squeegee member 25 adjusts the thickness of the powder material 13 that has been fed on the current collector 11. For example, there is a gap between the squeegee member 25 and the current collector 11 to be conveyed, and the thickness of the powder material 13 that passes therethrough is adjusted according to the gap. In this embodiment, the squeegee member 25 is a cylindrical roller member. The squeegee member 25 may be a blade-shaped member. It is desirable that the gap between the squeegee member 25 and the conveyed current collector 11 be adjusted to, for example, from about 100 μm to about 300 μm (preferably from about 150 μm to about 250 μm), although it may depend on the particle size and the weight per unit area (designed weight per unit area) of the granulated particle 13a.

«Step of Shaping Powder Material 13»

At step 7, the powder material 13 of the granulated particles 13a fed on the current collector 11 is shaped by the squeegee member 25. Here, the powder material 13 of the granulated particles 13a fed on the current collector 11 is squeegeed when it passes the squeegee member 25. The squeegee member 25 makes the thickness of the powder material 13 that has been fed on the current collector 11 uniform.

In this embodiment, the squeegee member 25 is a cylindrical roller member. The outer circumferential surface of the squeegee member 25 faces the current collector 11. In this case, it is desirable that the guide member 24 guide the powder material 13 of the granulated particles 13a to the gap S1 between the roller-shaped squeegee member 25 and the current collector 11. For example, it is desirable that when the roller-shaped squeegee member 25 is projected onto the current collector 11 along the normal of the current collector 11 at the position X1 at which the gap S1 between the squeegee member 25 and the current collector 11 is minimum in the conveying direction A of the current collector 11, the powder material 13 of the granulated particles 13a be fed in a region in which the squeegee member 25 is projected onto the current collector 11. In other words, it is desirable that the position X2 at which the powder material 13 of the granulated particles 13a is fed on the current collector 11 be set within the region in which the squeegee member 25 is projected onto the current collector 11. This enables the squeegee member 25 to make the thickness of the powder material 13 that has been fed on the current collector 11 uniform easily.

In this embodiment, the squeegee member 25 rotates in the opposite direction to the conveying direction of the current collector 11. This enables the squeegee member 25 to remove the excessive powder material 13 while pushing the powder material 13 of the granulated particles 13a on the current collector 11 back to the upstream side of the conveyor device 21.

Furthermore, in this embodiment, the powder material 13 of the granulated particles 13a that has been shaped by the squeegee member 25 is pressed against the current collector 11 in a post-process of step 7. Here, the current collector 11 with the shaped powder material 13 passes through the pressure rollers 26 and 27. The pressure rollers 26 and 27 are members between which the current collector 11 and the powder material 13 of the granulated particles 13a are interposed. In this embodiment, the rotation axes of the pressure rollers 26 and 27 are disposed horizontally, and their outer circumferential surfaces face each other in a horizontal direction. The current collector 11 is conveyed along one of the pressure rollers, the pressure roller 26. The squeegee member 25 is disposed above the pressure roller 26 so as to be spaced with a predetermined gap S1 from the current collector 11. The current collector 11 with the powder material 13 having been shaped by the squeegee member 25 is fed to the pressure rollers 26 and 27.

It is desirable that the gap between the pressure rollers 26 and 27 be adjusted taking the thickness of the powder material 13 to be deposited on the current collector 11 into consideration. The powder material 13 of the granulated particles 13a is pressed against the current collector 11 at an appropriate force by passing it between the pressure rollers 26 and 27. This serves to increase the contact locations of the binder 13a2 in the powder material 13 of the granulated particles 13a, so the granulated particles 13a are allowed to obtain a required adhesion strength. As a result, a layer of the powder material 13 of the granulated particles 13a containing the active material particles 13a1 (see FIG. 2) is formed on the current collector 11 with a substantially uniform thickness.

Hereinabove, various embodiments of the method of manufacturing a lithium-ion secondary battery electrode sheet proposed herein have been described, but the method, according to the present invention, of manufacturing a lithium-ion secondary battery electrode sheet is not limited by any of the foregoing embodiments, unless otherwise stated.

For example, as for the setting of the conveyance passage for conveying the current collector 11, the arrangement of the squeegee member 25, the pressure rollers 26 and 27, and so forth is not limited to the above-described embodiments. For example, in the example shown in the figures herein, the squeegee member 25 is disposed above the pressure roller 26. However, the squeegee member 25 does not need to be disposed above the pressure roller 26. The outer circumferential surfaces of the pressure rollers 26 and 27 face each other in a horizontal direction, but the pressure rollers 26 and 27 may be disposed so that the current collector 11 is interposed therebetween vertically.

The lithium-ion secondary battery electrode sheet manufactured by the manufacturing method proposed herein offers good productivity. The manufacturing method proposed herein can yield a lithium-ion secondary battery electrode sheet with stable product quality. Therefore, it can be used suitably for such applications that require mass productivity and stable performance. An example of such applications is a power source (driving power source) for electric motors incorporated in vehicles. The types of the vehicles are not particularly limited, and examples include plug-in hybrid vehicles (PHVs), hybrid vehicles (HVs), electric cargo vehicles, small-sized motorcycles, power assisted bicycles, electric powered wheelchairs, and electric railroads. Such a lithium-ion secondary battery may be used in the form of a battery module, in which a plurality of the batteries are connected in series and/or in parallel to each other.

REFERENCE SIGNS LIST

10 Manufacturing apparatus
11 Current collector
12 Binder solution
13 Powder material
13a Granulated particle
13a1 Active material particle
13a2 Binder
21 Conveyor device
21a, 21c Roll
21b Pulley
22 Coating device
22a Gravure roller
22b Reservoir
22c Backing roller
23 Feeding device
23a Hopper
23a1 Discharge port
23b Brush rotator
23c Mesh
24 Guide member
24a Guide surface
25 Squeegee member
26, 27 Pressure roller
31 Vibrator
32 Sensor
S1 Gap between the current collector 11 and the squeegee member 25
X1 Position at which the gap S1 is narrowest
X2 Position at which the powder material 13 of the granulated particles 13a is fed on the current collector 11

The invention claimed is:

1. A method of manufacturing a lithium-ion secondary battery electrode sheet, comprising the steps of:
preparing a current collector strip;
preparing a powder material of granulated particles containing active material particles and a first binder;
storing the powder material of the granulated particles in a container,
preparing a binder solution containing a second binder in a solvent;
coating the current collector with the binder solution;
conveying the current collector coated with the binder solution;
feeding, using a guide member that extends from at least from under a discharge port to a gap between an outer circumferential surface of a squeegee member and the current collector, the powder material of the granulated particles onto the current collector at a position between the outer circumferential surface of the squeegee member and the current collector, and
shaping the powder material of the granulated particles fed on the current collector, by using the squeegee member;
wherein a lower portion of the container has the discharge port covered by a mesh, and attached to the container is a brush rotator disposed above the mesh,
wherein the discharge port is arranged above the conveyed current collector coated with the binder solution, and
wherein in the step of feeding the powder material of the granulated particles, the powder material of the granulated particles is gradually fed from under the discharge port to the gap between the current collector and the squeegee member by the guide member arranged below the discharge port.

2. The method according to claim 1, wherein: the guide member includes a guide surface,
and wherein in the step of feeding the powder material of granulated particles, a height of the guide surface of the guide member gradually lowers from the discharge port toward the gap, and the powder material of the granulated particles is fed along the guide surface.

3. The method according to claim 1, wherein an amount of the powder material passing through the discharge port is adjusted according to an amount of the powder material that has remained before the squeegee member.

4. The method according to claim 1, wherein: the squeegee member is a cylindrical roller member and is disposed so that its outer circumferential surface faces the current collector; and the guide member guides the powder material of the granulated particles from under the discharge port to the gap between the roller member and the current collector.

5. The method according to claim 1, wherein: in the step of feeding the powder material of granulated particles, when viewed from an upstream side of a conveying direction of the current collector, the powder material of the granulated particles is fed to the position located within 5 cm upstream from a position at which the gap between the current collector and the squeegee member is narrowest.

6. The method according to claim 5, wherein: in the step of feeding the powder material of granulated particles, when viewed from an upstream side of a conveying direction of the current collector, the powder material of the granulated particles is fed to the position located within 3 cm upstream from a position at which the gap between the current collector and the squeegee member is narrowest.

7. The method according to claim 2, wherein the powder material of the granulated particles is transferred from the discharge port toward the gap by vibrating the guide surface.

\* \* \* \* \*